United States Patent
Kleinburger et al.

(10) Patent No.: US 6,272,893 B1
(45) Date of Patent: Aug. 14, 2001

(54) APPARATUS AND METHOD FOR BENDING WINDING BARS

(75) Inventors: Johann Kleinburger, Höri; Felix Hauri, Birmenstorf, both of (CH)

(73) Assignee: ABB Alstom Power (Schweiz) AG, Baden (CH)

( * ) Notice: Subject to any disclaimer, the term of this patent is extended or adjusted under 35 U.S.C. 154(b) by 0 days.

(21) Appl. No.: 09/551,564

(22) Filed: Apr. 18, 2000

(30) Foreign Application Priority Data

Apr. 26, 1999 (DE) .............................. 199 18 854

(51) Int. Cl.[7] .................................................. B12D 5/04
(52) U.S. Cl. .................................. 72/16.2; 72/310
(58) Field of Search ....................... 72/16.4, 310, 308, 72/298, 301, 311, 303, 307, 16.2

(56) References Cited

U.S. PATENT DOCUMENTS

| | | | |
|---|---|---|---|
| 1,566,227 | * 12/1925 | Pleasant . | |
| 3,878,720 | * 4/1975 | Stange | 72/310 |
| 3,899,908 | * 8/1975 | Somov | 72/310 |
| 4,022,045 | * 5/1977 | Riha | 72/310 |
| 4,056,960 | * 11/1977 | Kawanami | 72/310 |
| 4,195,506 | * 4/1980 | Kawanimi | 72/16.5 |
| 5,259,224 | * 11/1993 | Schwarze | 72/16.4 |
| 5,913,929 | 6/1999 | Gustafsson et al. | 72/31.1 |

FOREIGN PATENT DOCUMENTS

| | | |
|---|---|---|
| 225061B5 | 7/1985 | (DE) . |
| 237992A1 | 8/1986 | (DE) . |
| 244086A1 | 3/1987 | (DE) . |
| 19637115A1 | 3/1998 | (DE) . |
| 0222140A1 | 5/1987 | (EP) . |
| 0251207A1 | 1/1988 | (EP) . |
| 0328307A1 | 8/1989 | (EP) . |
| 57-196855A | 12/1982 | (JP) . |
| 60-098843 | 6/1985 | (JP) . |
| 61-135349 | 6/1986 | (JP) . |
| 06261505 | 9/1994 | (JP) . |

* cited by examiner

Primary Examiner—Daniel C. Crane
(74) Attorney, Agent, or Firm—Burns, Doane, Swecker & Mathis, L.L.P.

(57) ABSTRACT

The present invention relates to an apparatus and a method for bending hard-drawn copper conductor bars for rotor windings of turbo-generators and engines. This method makes it possible to prevent heating up and accompanying transformation of hard-drawn copper into soft copper, which leads to a reduction in the stability with respect to centrifugal forces and thermal expansions. The apparatus and the method permit automatic, step-by-step bending of hard-drawn copper conductor bars, with sensing of the bending radius achieved and correction in the direction of the desired bending radius. For this purpose, initially a hard-drawn copper conductor bar is bent by means of a pair of bending cylinders to a previously set bending radius, the bending radius actually achieved is measured and a correction of the bending radius used in the next step takes place, in order to achieve an approximation to the desired bending radius.

9 Claims, 2 Drawing Sheets

APPARATUS AND METHOD FOR BENDING WINDING BARS

FIELD OF THE INVENTION

The invention relates to the field of turbo-generators. In particular, the invention relates to an apparatus and a method for bending winding bars for the rotor winding of turbo-generators.

BACKGROUND OF THE INVENTION

Rotor windings for turbo-generators are conventionally produced as a rule from soft copper, in order to permit bending of the conductors. In the case of relatively small generators in particular, groups of soft copper conductor bars are used for the rotor winding, bent subsequently bundle by bundle into the desired shape.

In the case of large generators, however, there is the problem that the high centrifugal forces cause rotor windings of soft copper to be displaced and deformed and therefore this is no longer a suitable material. Therefore, soft copper conductor bars have been replaced by hard-drawn copper conductor bars. With these hard-drawn copper conductor bars, however, it had then been necessary to solve the problem concerning how the required curvature of these conductor bars for producing rotor windings can be achieved.

Therefore, it was initially attempted to apply to hard-drawn copper conductor bars a bending method analogous to that used for bundles of soft copper conductor bars. However, problems were encountered when bending bundles of hard-drawn copper conductor bars. Owing to the fact that the individual hard-drawn copper conductor bars spring back differently after bending—by contrast with the conventional soft copper conductor bars—it was not possible to bend a compact bundle into a desired shape. Due to this different springing back of the individual hard-drawn copper conductor bars, the need arose for re-working, or re-bending, the individual hard-drawn copper conductor bars until a bundle of the desired shape is finally obtained. However, such a method would be far too laborious for the production of rotor windings and is consequently too cost-intensive. Furthermore, owing to the different behavior of the individual hard-drawn copper conductor bars, it is difficult to maintain reliably a required degree of accuracy.

Therefore, in the state of the art a compromise is currently accepted to improve stability. To be specific, in order to obtain curvatures, individual rotor windings are joined together from hard-drawn copper conductor bar segments, in order to achieve greater stability of the rotor windings with respect to centrifugal forces. These hard-drawn copper conductor bar segments are in this case connected by means of a corner soldered joint, at which the greatest axial stressing due to thermal expansion takes place, in order to achieve the curvature required for the rotor winding.

However, with this corner soldered joint, the heating effect during the soldering operation makes the hard-drawn copper turn into soft copper in the region of the soldering location. This has the result of producing in the regions of the soldering locations soft regions in which the rotor windings therefore have less stability with respect to centrifugal forces, even if this structure is more stable in comparison with conventional soft copper conductor bars. What is more, corner soldered joints are laborious to produce.

SUMMARY OF THE INVENTION

It is therefore the object of the present invention to design an apparatus and a method for the simple and reliable bending of hard-drawn copper conductor bars for rotor windings, so that there is no longer the need for curvatures to be obtained by joining together individual hard-drawn copper conductor bar segments by means of soldering and it is possible as a result to avoid softening of individual regions of the bars due to the heating effect during the soldering operation.

Consequently, with the apparatus according to the invention and the method according to the invention a rotor winding can be produced in a simple way from hard-drawn copper conductor bars and consequently increased stability of the rotor winding with respect to mechanical and thermal stresses, such as centrifugal forces for example, can be achieved in all regions.

BRIEF DESCRIPTION OF THE DRAWINGS

The invention is explained in more detail below on the basis of embodiments represented in the drawing, in which.

DETAILED DESCRIPTION OF THE INVENTION

The method according to the invention and apparatus according to the invention are intended in particular to achieve the effect that rotor windings can be bent in each case from hard-drawn copper conductor bars and, when doing so, parameters such as radius, number of conductors, number of profiles, section length and different copper hardness for example, can be kept well under control.

The method according to the invention and the apparatus according to the invention now achieve the effect that—irrespective of whether hard-drawn or soft copper is concerned—new or differently shaped copper profiles for a new type of generator or a retrofit winding, which conventionally required high costs for new bending tools, can now be offered quickly and cost-effectively, virtually without any additional tool costs.

In the following text, firstly the construction of an apparatus according to the invention for bending hard-drawn copper conductor bars is described with reference to FIG. 1.

Figure 1:
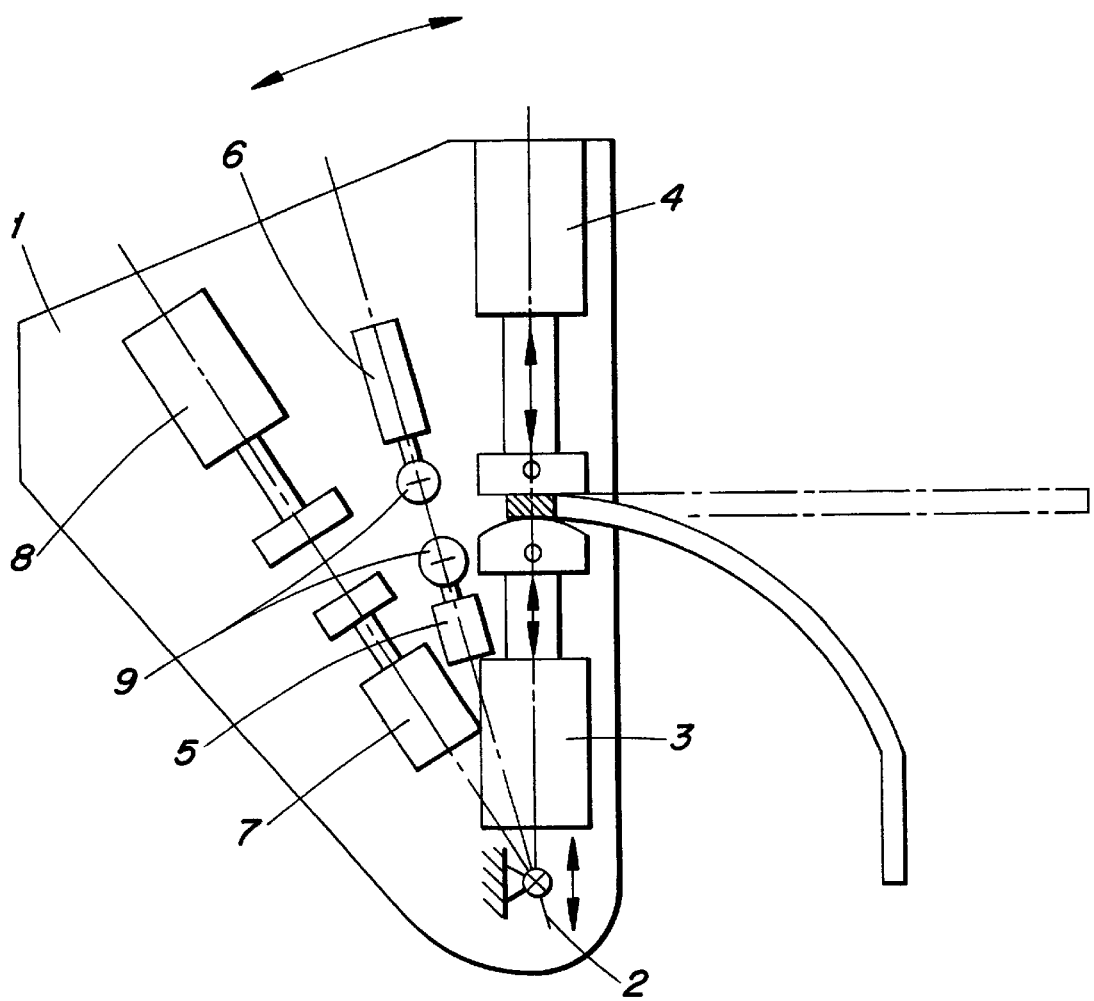
FIG. 1 shows a representation of a bending apparatus according to the invention for hard-drawn copper conductor bars and FIGS. 2a and 2b show two modifications according to the invention of the bending apparatus illustrated in FIG. 1.

FIG. 1 shows a schematic representation of a bending apparatus according to the invention for hard-drawn copper conductor bars.

The bending apparatus comprises a swivel arm 1, which has a pivot point 2 which can be displaced according to the bending radius. Furthermore, formed on one side of the swivel arm 1, parallel to this side surface, are an inner bending cylinder 3 and an outer bending cylinder 4, between which a hard-drawn copper conductor bar to be bent can be introduced for bending. In this case, the outer bending cylinder 4 has, toward the hard-drawn copper conductor bar to be pushed in, a bending jaw with a planar surface, while the inner bending cylinder 3 has, toward the hard-drawn copper conductor bar, a shaping jaw with a curved surface, over which the hard-drawn copper conductor bar is bent. In this exemplary embodiment, the curved surface is preferably shaped in cross-sectional view in the form of an arc of a circle. The surfaces of the bending jaw and the shaping jaw are arranged opposite one another, with the gap into which the hard-drawn copper conductor bar can be introduced between them.

After bending, the hard-drawn copper conductor bar is pushed forward between the bending jaw of the inner bending cylinder 3 and the shaping jaw of the outer bending cylinder 4 toward the center of the swivel arm 1 in the direction of a pair of measuring cylinders 5 and 6, so that the hard-drawn copper conductor bar can be measured by a measuring system 9 formed by an inner measuring cylinder 5 and an outer measuring cylinder 6. The measuring system 9 is designed to determine in this measurement the achieved bending radius of the hard-drawn copper conductor bar and to establish by a comparison with prescribed values of the bending radius a possible deviation from the latter. To ensure reliable bending by the bending cylinders 3 and 4, after passing the measuring cylinders 5 and 6 the hard-drawn copper conductor bar is securely clamped during each bending step and measuring step by means of two (inner and outer) clamping cylinders 7 and 8, which are arranged in parallel along the opposite side surface of the swivel arm 1. In this case, the hard-drawn copper conductor bar is clamped in by moving two movable contact parts of the inner and outer clamping cylinders 7 and 8 and pressing them onto the hard-drawn copper conductor bar.

The inner and outer bending cylinders 3 and 4, the inner and outer measuring cylinders 5 and 6 and the inner and outer clamping cylinders 7 and 8 are respectively arranged on an imaginary radial line extending from the pivot point 2 of the swivel arm 1, so that in a bending and measuring operation the respective cylinders are on a portion of the arc of a circle.

Figure 2A:
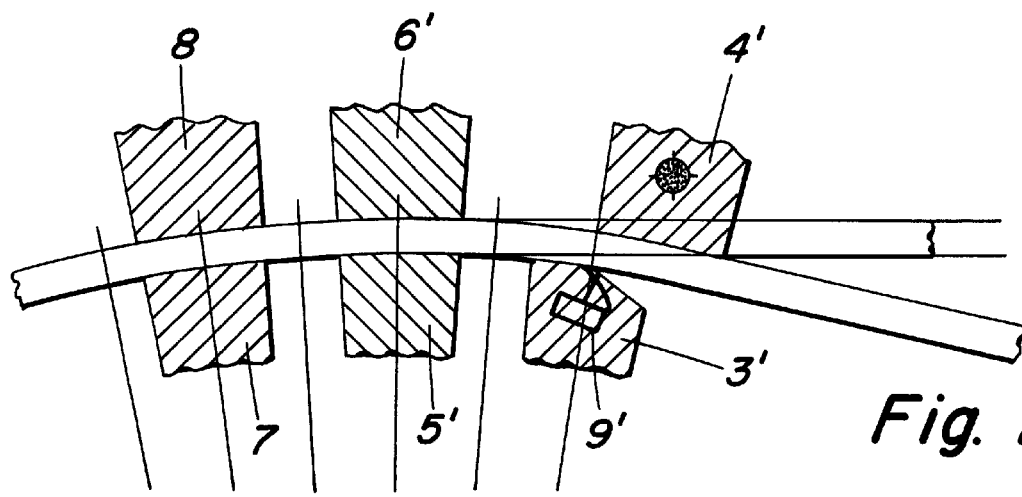
Figure 2B:
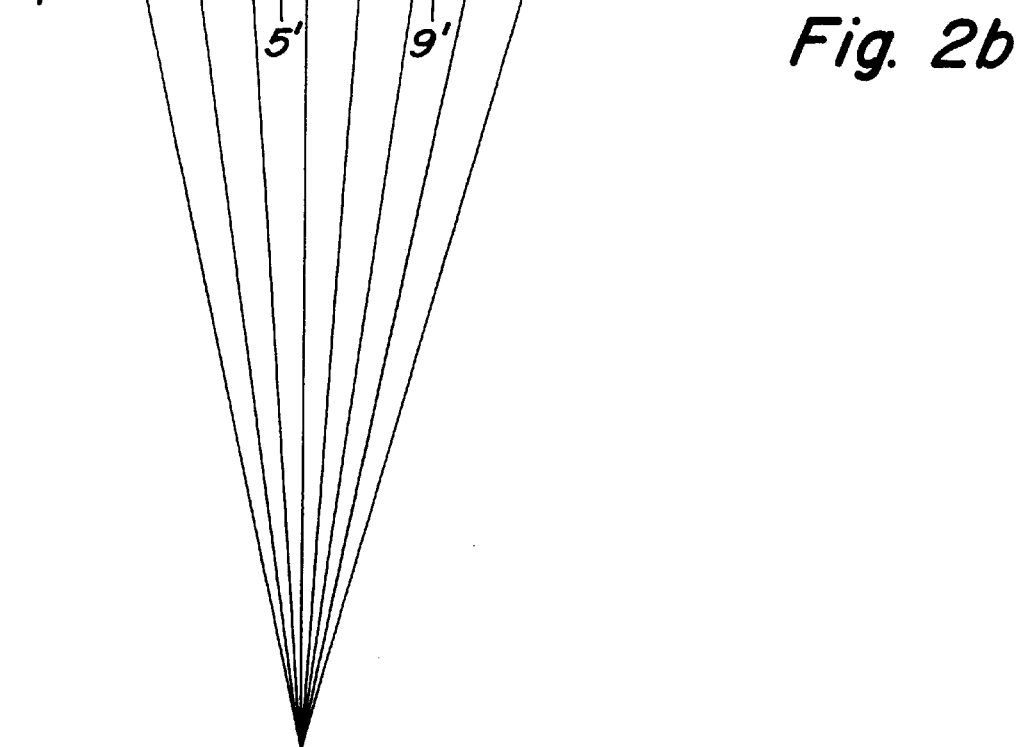

FIGS. 2a and 2b then show a modification of the bending apparatus according to FIG. 1. Here, a pair of inner and outer bending cylinders 3' and 4' are similarly used. In this case, the inner bending cylinder 3' comprises a shaping jaw and the outer bending cylinder 4' comprises a bending jaw, which, for bending, can respectively be brought into contact in each case with the hard-drawn copper conductor bar. As a difference in comparison with the preceding exemplary embodiment, in the modified exemplary embodiments a measuring system 9' is additionally accommodated in the shaping jaw of the inner bending cylinder 3'. This measuring system 9' continuously carries out a measurement of the bending radius of the hard-drawn copper conductor bar achieved by means of bending the hard-drawn copper conductor bar over the shaping and bending jaws of the bending cylinders 3' and 4'. In a way similar to in the measuring system 9 according to the first exemplary embodiment, a comparison takes place between the measured values obtained and the setpoint values specified for a predetermined bending radius.

By forming the measuring system 9' in the shaping jaw of the bending cylinder 3', the measuring cylinders 5 and 6 used in the first exemplary embodiment are rendered superfluous. Instead of them, now a second pair of inner and outer clamping cylinders 5' and 6' are formed, serving for fixing the hard-drawn copper conductor wire during bending.

The inner bending cylinder 3' and outer bending cylinder 4', together with the swivel arm 1, are designed such that they can swivel about pivot point 2 of the swivel arm 1, along the radius to be bent, in order to be able to carry out bending of the hard-drawn copper conductor bar over the shaping jaw of the inner bending cylinder 3' to the desired radius. What is more, by contrast with the first exemplary embodiment, the bending jaw of the outer bending cylinder 4' is arranged offset with respect to the shaping jaw of the inner bending cylinder 3' toward the edge of the swivel arm 1. The surface of the shaping jaw of the inner bending cylinder 3' has in this case a straight surface region and, alongside it, a bevelled surface region, the shaping jaw of the outer bending cylinder 4' being arranged opposite this bevelled surface region.

As shown in the embodiments represented in FIGS. 2a and 2b, the pairs of cylinders can be spaced apart from one another by a predetermined distance (FIG. 2a) or else be in direct lateral contact with one another (FIG. 2b). The latter arrangement may be more advantageous for producing a small bending radius.

In the following text, the method used for bending the hard-drawn copper conductor bars is now explained in more detail with reference to FIGS. 1, 2a and 2b.

The method according to the invention, used for bending hard-drawn copper conductor bars, comprises the following steps:

1) Setting the desired bending radius

Firstly, in this method the pivot point 2 of the swivel arm 1 is displaced according to the desired bending radius of the hard-drawn copper conductor bar into the position belonging to this bending radius. As a result, the bending cylinders 3 and 4 or 3' and 4' are moved to the starting positions required for achieving the desired bending radius.

2) Bending a conductor bar of hard-drawn copper by means of bending cylinders

Subsequently, the hard-drawn copper conductor bar to be bent is introduced into a gap between the bending jaw of the outer bending cylinder 4 or 4' and the shaping jaw of the inner bending cylinder 3 or 3'. In this case, the hard-drawn copper conductor bar in the first embodiment, illustrated in FIG. 1, is pushed just so far into the gap between the inner bending cylinder 3 or 3' and the outer bending cylinder 4 or 4', i.e. into the gap formed by the shaping jaw and the bending jaw, that the region of the hard-drawn copper conductor bar to be bent in a first step comes to lie centrally about the longitudinal axis formed by the inner and outer bending cylinders 3 and 4 or 3' and 4'. Then, the bending jaw of the outer bending cylinder 4 or 4' and the shaping jaw of the inner bending cylinder 3 or 3' are brought into contact with the surface of the hard-drawn copper conductor bar and subjected to pressure, in order to achieve bending of the hard-drawn copper conductor bar according to the radius predetermined by the position of the pivot point 2 and the curvature of the shaping jaw of the inner bending cylinder 3.

3) Measuring the bending radius achieved of the hard-drawn copper conductor bar and comparison with a desired bending radius By means of a measuring system 9 or 9', formed either in a pair of measuring cylinders 5 and 6 (FIG. 1) or in the inner bending cylinder 3' (FIGS. 2a and 2b), the bending radius of the hard-drawn copper conductor bar is determined. When using the measuring cylinders 5 and 6, the hard-drawn copper conductor bar is advanced beforehand until it comes to lie between the measuring cylinders 5 and 6. In the measuring system 9 or 9', the bending radius achieved is established and compared with a desired bending radius, stored beforehand in the measuring system 9 or 9'.

4) Adapting the next bending step of the hard-drawn copper conductor bar

In the following step, the position of the pivot point 2 of the swivel arm 1 is adapted in response to the result of the comparison in such a way that, in a further bending step, in which bending of a following region of the hard-drawn copper conductor bar is carried out, an approximation to the desired bending radius, from which there has previously been a deviation, can be achieved. This adaptation of the position of the pivot point 2 of the swivel arm 1 and the measurement of the bending radius achieved take place automatically here, without the need for involvement of an operator.

5) Repetition of the above steps over the extent of the entire hard-drawn copper conductor bar in the regions to be bent The steps described above of the bending operation for the hard-drawn copper conductor bar are repeated continually until the desired overall bending radius of the hard-drawn copper conductor bar has been achieved, i.e. the entire region to be bent is bent step by step by means of the shaping jaw of the inner bending cylinder 3 or 3' and the bending jaw of the outer bending cylinder 4 or 4', with continual checking of the bending radius.

In this way, a hard-drawn copper conductor bar can be bent in a simple way with the apparatus according to the invention and the method according to the invention. In this case, there is no need for intervention by an operator, since a comparison of the setpoint value of the bending radius with the actual value achieved automatically takes place continually and, if there are deviations, a correction is performed by an immediate measure, for example an adaptation of the pivot point 2 of the swivel arm 1. As a result, an adaptation according to different material hardnesses and, in response to different springing back of different hard-drawn copper conductor bars, etc., is also possible at any time in a simple way. Consequently, hard-drawn copper conductor bars that are bent according to the required curvature of the rotor winding and lie well in one another when joined together for producing the rotor winding are obtained by means of the method according to the invention and the apparatus according to the invention.

To sum up, the present invention relates to an apparatus and a method for bending hard-drawn copper conductor bars for rotor windings of turbo-generators and engines. This method makes it possible to prevent heating up and accompanying transformation of hard-drawn copper into soft copper, which leads to a reduction in the stability with respect to centrifugal forces. The apparatus and the method permit automatic, step-by-step bending of hard-drawn copper conductor bars, with sensing of the bending radius achieved and correction in the direction of the desired bending radius. For this purpose, initially a hard-drawn copper conductor bar is bent by means of a pair of bending cylinders to a previously set bending radius, the bending radius actually achieved is measured and a correction of the bending radius used in the next step takes place, in order to achieve an approximation to the desired bending radius.

What is claimed is:

1. An apparatus for bending hard-drawn copper conductor bars for turbo-generators and engines, comprising:

a swivel arm, which has a displaceable pivot point, an inner bending cylinder and an outer bending cylinder, which are arranged on the swivel arm, the outer bending cylinder comprising a bending jaw and the inner bending cylinder having a shaping jaw and it being possible for a hard-drawn copper conductor bar to be introduced between the bending jaw and the shaping jaw for bending to a predetermined bending radius, a pair of cylinders, which are respectively arranged alongside the inner and outer bending cylinder and between which the bent hard-drawn copper conductor bar can be clamped in, a pair of clamping cylinders, which in turn are respectively arranged alongside the pair of cylinders, for clamping in the bent hard-down copper conductor bar, a measuring system for measuring a bending radius of the bent hard-drawn copper conductor bar and for establishing a deviation from the predetermined bending radius, a device for displacing the pivot point of the swivel arm in response to a deviation from the predetermined bending radius, the cylinders, bending cylinders and clamping cylinders being respectively arranged on a line extending radially outward from the pivot point and the corresponding inner and outer cylinders respectively lying on an arc of a circle, and wherein the measuring system is arranged in the pair of cylinders.

2. The apparatus as claimed in claim 1, wherein the outer bending cylinder comprises a bending jaw which has, on the side facing the inner bending cylinder, a planar surface.

3. An apparatus for bending hard-drawn copper conductor bars for turbo-generators and engines, comprising:

a swivel arm, which has a displaceable pivot point, an inner bending cylinder and an outer bending cylinder, which are arranged on the swivel arm, the outer bending cylinder comprising a bending jaw and the inner bending cylinder having a shaping jaw and it being possible for a hard-drawn copper conductor bar to be introduced between the bending jaw and the shaping jaw for bending to a predetermined bending radius, a pair of cylinders, which are respectively arranged alongside the inner and outer bending cylinder and between which the bent hard-drawn copper conductor bar can be clamped in, a pair of clamping cylinders, which in turn are respectively arranged alongside the pair of cylinders, for clamping in the bent hard-down copper conductor bar, a measuring system for measuring a bending radius of the bent hard-drawn copper conductor bar and for establishing a deviation from the predetermined bending radius, a device for displacing the pivot point of the swivel arm in response to a deviation from the predetermined bending radius, the cylinders, bending cylinders and clamping cylinders being respectively arranged on a line extending radially outward from the pivot point and the corresponding inner and outer cylinders respectively lying on an arc of a circle, and wherein the measuring system is arranged in at least one of the bending cylinders and the pair of cylinders serve as a second pair of clamping cylinders.

4. The apparatus as claimed in claim 3, wherein the measuring system is arranged in the inner bending cylinder.

5. The apparatus as claimed in claim 4, wherein the measuring system is arranged in a shaping jaw of the inner bending cylinder.

6. An apparatus for bending hard-drawn copper conductor bars for turbo-generators and engines, comprising:

a swivel arm, which has a displaceable pivot point, an inner bending cylinder and an outer bending cylinder, which are arranged on the swivel arm, the outer bending cylinder comprising a bending jaw and the inner bending cylinder having a shaping jaw and it being possible for a hard-drawn copper conductor bar to be introduced between the bending jaw and the shaping jaw for bending to a predetermined bending radius, a pair of cylinders, which are respectively arranged alongside the inner and outer bending cylinder and between which the bent hard-drawn copper conductor bar can be clamped in, a pair of clamping cylinders, which in turn are respectively arranged alongside the pair of cylinders, for clamping in the bent hard-down copper conductor bar, a measuring system for measuring a bending radius of the bent hard-drawn copper conductor bar and for establishing a deviation from the predetermined bending radius, a device for displacing the pivot point of the swivel arm in response to a deviation from the predetermined bending radius, the cylinders, bending cylinders and clamping cylinders being respectively arranged on a line extending radially outward from the pivot point and the corresponding inner and outer cylinders respectively lying on an arc of a circle, and wherein the inner bending cylinder comprises a shaping jaw which has, on the side facing the outer bending cylinder, a surface that is cross-sectionally in the form of an arc of a circle and over which the hard-drawn copper conductor bar can be bent, and the outer bending cylinder comprises a bending jaw which has, on the side facing the inner bending cylinder, a planar surface which is arranged directly opposite the surface of the shaping jaw of the inner bending cylinder that is cross-sectionally in the form of an arc of a circle.

7. An apparatus for bending hard-drawn copper conductor bars for turbo-generators and engines, comprising:

a swivel arm, which has a displaceable pivot point, an inner bending cylinder and an outer bending cylinder, which are arranged on the swivel arm, the outer bending cylinder comprising a bending jaw and the inner bending cylinder having a shaping jaw and it being possible for a hard-drawn copper conductor bar to be introduced between the bending jaw and the shaping jaw for bending to a predetermined bending radius, a pair of cylinders, which are respectively arranged alongside the inner and outer bending cylinder and between which the bent hard-drawn copper conductor bar can be clamped in, a pair of clamping cylinders, which in turn are respectively arranged alongside the pair of cylinders, for clamping in the bent hard-down copper conductor bar, a measuring system for measuring a bending radius of the bent hard-drawn copper conductor bar and for establishing a deviation from the predetermined bending radius, a device for displacing the pivot point of the swivel arm in response to a deviation from the predetermined bending radius, the cylinders, bending cylinders and clamping cylinders being respectively arranged on a line extending radially outward from the pivot point and the corresponding inner and outer cylinders respectively lying on an arc of a circle, and wherein the inner bending cylinder comprises a shaping jaw which has, on the side facing the outer bending cylinder, a planar surface part and a surface part beveled away form the outer bending cylinder, and the outer bending cylinder comprises a bending jaw which has, on the side facing the inner bending cylinder, a planar surface which is arranged directly opposite the beveled surface part of the shaping jaw of the inner bending cylinder.

8. A method for bending a hard-drawn copper conductor bar for a turbo-generator or engine, comprising the steps of:

setting a desired bending radius of a hard-drawn copper conductor bar by means of corresponding positioning of the pivot point of the swivel arm, in order to bring the inner and outer bending cylinders to the required starting position, bending the hard-drawn copper conductor bar, the outer bending cylinder being subjected to pressure and, as a result, bending the hard-drawn copper conductor bar by means of the inner bending cylinder, measuring the bending radius achieved of the hard-drawn copper conductor bar by means of the measuring system and comparing it with the desired bending radius, displacing the pivot point of swivel arm in response to the result of the comparison, in order to make the bending radius of hard-drawn copper conductor bar approximate the desired bending radius in a next bending step, and repeating the preceding steps until the hard-drawn copper conductor bar is bent in the required region with the desired bending radius.

9. The method as claimed in claim 8, wherein the bending of the hard-drawn copper conductor bar, the measuring of the bending radius achieved and the displacing of the pivot point of the swivel arm in response to the result of the comparison take place automatically and without intervention by an operator.

* * * * *